GEORGE EVELEIGH.
Improvement in the Manufacture of Gas for Illuminating and Heating.
No. 123,255. Patented Jan. 30, 1872.
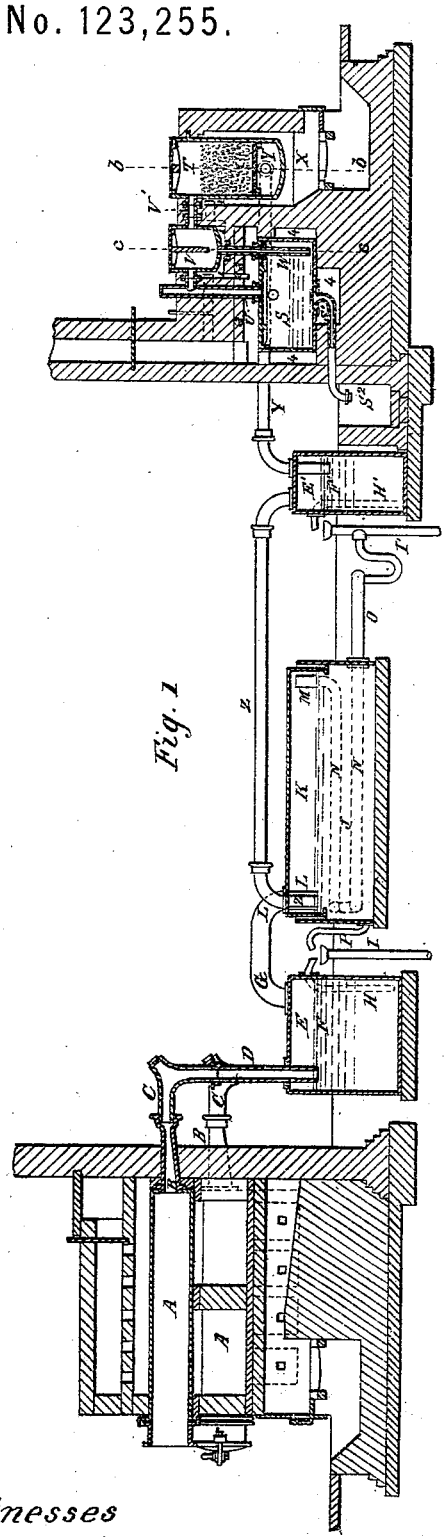

UNITED STATES PATENT OFFICE.

GEORGE EVELEIGH, OF ASYLUM ROAD, PECKHAM, GREAT BRITAIN.

IMPROVEMENT IN THE MANUFACTURE OF GAS FOR ILLUMINATING AND HEATING.

Specification forming part of Letters Patent No. 123,255, dated January 30, 1872.

I, GEORGE EVELEIGH, of 16 Asylum Road, Peckham, in the county of Surrey, in the Kingdom of Great Britain, have invented certain "Improvements in the Manufacture and Purification of Gas, and in certain parts of the apparatus employed therein," of which the following is a specification:

My invention relates to the manufacture and purification of gas generated from coal, shale, bitumen, petroleum, turba, peat, oil, wood, and, in some cases, water, or other analogous substances. My process consists in distilling from the substances, at a comparatively low temperature, the best and richest portions of the gas, together with the oleaginous, tarry, and other vaporizable matters. The rich gas is then cooled, purified, and passed to the gas-holder for use. The oleaginous and other vaporizable matters condensed from the said rich gas are caused to flow gradually into a heated pan, where they are revaporized at a suitable temperature, and from whence the vapors so produced are passed through one or more heated redistillation-retorts, charged with charcoal or certain other substances similarly to those described in the specification of application for a patent filed by me in the United States Patent Office, November 12, 1869. In this redistillation-retort or retorts the said vapors are converted into permanent gas, which gas is then cooled, mixed with the rich gas first formed, and purified along with it, or cooled and purified by itself, and then mixed with the other gas in the gas-holder or other vessel.

Figure 1 is a sectional elevation on line $a$ $a$ of Fig. 2, illustrative of an apparatus suitable for carrying out the said process for manufacturing gas from coal; Fig. 2, a plan of the same, partly in section; Fig. 3, a half elevation and half vertical section of a bench of three retorts, but any suitable number may be employed; Fig. 4, a vertical section on line $c$ $c$ of Fig. 1 through the revaporizing-pan and its connections; Fig. 5, a vertical section on line $b$ $b$ of Fig. 1 through the redistillation-retort.

A A, the iron retorts, in which the coal is distilled, which are set in the ordinary manner, and which are to be maintained at an equalized and uniform temperature of from 600° to 1,300° Fahrenheit, according to the kind of coal employed. The charge should be subjected to this heat for about twelve hours; B B, necks or pipes of a conical shape, forming the outlets for the gas and vapors. They are incased in brick-work so as to be shielded from the heat of the furnace-flues, to prevent their becoming red-hot, which would cause more or less of the carbon of the gas to be thrown down and the illuminating power thereby reduced; C C C and D D D, outlet-pipes, which convey the gas and vapors downward into E, the first cooling-tank, which I prefer to employ instead of the ordinary hydraulic main; F, level of water in cooling-tank, into which dip-pipes D D D from retorts enter; G, the outlet-pipe, placed at opposite side of the tank so that the gas issuing from the dip-pipes has to traverse over an extended surface of water before arriving at the outlet, by which means it is quickly cooled and the larger portion of the oily and tarry substances condensed more quickly and certainly than in the ordinary hydraulic main, and fall to the bottom of the tank; H, dip-pipe for removing these substances from the tank; I, pipe to convey them to the tar-well; J K, second cooler or condenser, which may be of the ordinary kind; but I prefer it as shown; L, inlet from first coooling-tank for gas, which has to pass over an extended surface of water before arriving at M, pipe leading to N N, coil of pipe, by which the condensation is completed; O, pipe for carrying gas to the purifiers in the ornary manner; P, dip-pipe to convey oily and tarry substances from condenser to tar-well. The oily and tarry substances collected in the tar-well from this and the first cooling-tank are conveyed, by pumping or otherwise, into an elevated tank, not shown, from which they are caused to flow in a regulated quantity through R, a sealed pipe or inverted siphon, into S, a revaporizing-pan, kept at a temperature of about 500° to 700° Fahrenheit, in which the volatile constituents of the oily and tarry substances are revaporized, leaving the pitch deposited at the bottom. $S^1$, pipe for drawing off the said pitch from time to time; $S^2$, a receptacle to receive the said pitch; T, a redistillation-retort of the following description: It is a vertical, cylindrical, or other shaped vessel, of cast or wrought iron, closed at bottom but open at top, and fitted with a cast-iron cover. I prefer to make it about three or four feet high and about two feet diameter. A perforated false bottom is supported at a short distance above the bottom of the retort, and on this is placed a charge of charcoal in small lumps; or, in some cases, coke may be used; but, for the most part, I use charcoal only; and either of these may be mixed with pieces of chalk, lime, or similar substances not too finely broken, as it would prevent the proper filtration of the gas. U, a pipe by which the vapors generated in the revaporizing-pan are conveyed from it into V, an intermediate chamber, heated to a temperature of about 700° to 900° Fahrenheit, forming a trap in which any pitchy or mucilaginous substance may be deposited which might, from any cause, be carried over with the vapors; W, a pipe for conveying such substances back into the revaporizing-pan S; V', pipe to convey volatile vapors from intermediate chamber into upper end of redistillation-retort T. These volatile vapors pass down through the charcoal or other substances in the redistillation-retort, and are thereby decomposed into permanent gas, which passes through the false bottom into the space beneath, escaping by Y, a pipe leading to the cooling-tank E', (similar to E before described,) wherein any vapors which have passed the redistillation-retort undecomposed are partially or wholly recondensed. H' I', pipes to convey such recondensed matters to the tar-well, whence they are again withdrawn along with those before explained, and passed, again and again, through the revaporizing-pan and redistillation-retort as long as any gas-yielding substance remains in them; or, instead of going to the tar-well, they may be used as drying-oils for paints, varnishes, &c., for which they are found well adapted; Z, a pipe for conveying the oil-gas to the condenser, where it mixes with the coal-gas, passing through it to the purifiers; or, if preferred, the oil-gas may be passed through a separate condenser and purifier before mixing with the coal-gas; X, furnace for heating redistillation-retort and its contents to a temperature of about 900° to 1,300° Fahrenheit, according to the speed with which the oil or tar is admitted into the revaporizing-pan S; 1 1, flues by which intermediate chamber V is heated from furnace X; 2, flue communicating with under side of arch 3 3, by which the cover of revaporizing-pan S is heated, the heat reverberated downward therefrom onto the oil, evaporating it from the surface; 4 4 4, air-flues to keep the revaporizing-pan cool below, to prevent ebullition, which might cause the oil or tar to be carried over the redistillation-retort in a fluid state.

Any suitable number of redistillation-retorts may receive the vapors produced in the revaporizing-pan, or each may be arranged with a revaporizing-pan and intermediate chamber, as shown in dotted lines, Fig. 2.

The revaporizing-pan may also, with advantage, be used with or without the intermediate chamber in connection with the redistillation-retort when producing gas therein from any fluid material, such as the vegetable or mineral oils, or from liquefiable gas-yielding solids, in order to prevent any pitchy, resinous, or mucilaginous matters present in them from entering the charcoal-retort, and which matters are not required in or are prejudicial to the formation of good illuminating-gas.

In cases where a greater decomposing power is required than can be obtained with one cylinder I employ two or more, connected together, so that the vapors may pass through each in succession.

By this process I am enabled to employ a comparatively low temperature, and thereby not only produce a larger total quantity of gas, but the illuminating power and purity of the gas so produced are so much greater than can be obtained by the ordinary process, in which a great heat is employed. The value of the residual products, such as the coke and pitch, is also greatly increased.

I claim as my invention—

1. The production of rich gas, together with the oily, tarry, and other gas-producing vapors, by the primary distillation, the treatment of the said rich gas and the oily, tarry, and other gas-producing vapors resulting from such primary distillation, and also the secondary distillation and treatment or conversion into permanent gas of the volatile constituents of such vapors, substantially as herein described.

2. The general arrangement and adaptation of the retort, cooling-tank, and condenser composing the apparatus for effecting the primary distillation and treatment of the rich gas and oily and other vapors, substantially as herein described and shown.

3. The combination of the revaporizing-pan with the redistillation-retort, whether with or without the intermediate chamber, substantially as and for the purposes described and shown.

4. The combination of the apparatus for effecting the primary distillation and treatment of the rich gas and oily and other vapors with that for effecting the secondary distillation and treatment or conversion into permanent gas of the volatile constituents of the oily and other vapors, substantially as described and shown.

GEO. EVELEIGH.

Witnesses:
GEO. B. SCHOLES,
W. H. BECK.